(12) United States Patent
Wu et al.

(10) Patent No.: US 8,716,428 B2
(45) Date of Patent: May 6, 2014

(54) FLUORINATED POLYESTER COMPOUND, COATING COMPOSITIONS COMPRISING THE COMPOUND AND METHODS OF MAKING

(75) Inventors: Jin Wu, Webster, NY (US); Lanhui Zhang, Webster, NY (US); Lin Ma, Pittsford, NY (US); David W. Martin, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 79 days.

(21) Appl. No.: 13/443,548

(22) Filed: Apr. 10, 2012

(65) Prior Publication Data
US 2013/0266732 A1 Oct. 10, 2013

(51) Int. Cl.
- *B05D 3/00* (2006.01)
- *C08G 63/82* (2006.01)
- *C08L 67/02* (2006.01)
- *C08G 63/682* (2006.01)

(52) U.S. Cl.
CPC .............. *C08G 63/682* (2013.01); *C08G 63/82* (2013.01); *C08L 67/02* (2013.01)
USPC ........... 528/191; 528/176; 528/182; 525/534; 525/418; 525/403; 525/408; 427/385.5; 524/539

(58) Field of Classification Search
CPC ....... C08G 63/82; C08G 63/682; C08L 67/02
USPC .......... 525/534, 418, 403, 408; 528/176, 182, 528/191; 427/385.5; 524/539
See application file for complete search history.

(56) References Cited

U.S. PATENT DOCUMENTS

| | | | |
|---|---|---|---|
| 5,073,466 A * | 12/1991 | Ishikawa et al. | 430/66 |
| 7,205,079 B2 | 4/2007 | Wu et al. | |
| 7,452,643 B2 | 11/2008 | Wu et al. | |
| 7,459,250 B2 | 12/2008 | Wu et al. | |
| 7,507,510 B2 | 3/2009 | Wu et al. | |
| 7,935,768 B2 | 5/2011 | Moorlag et al. | |
| 8,097,319 B2 | 1/2012 | Wu et al. | |
| 8,099,035 B2 | 1/2012 | Qi et al. | |
| 2006/0008718 A1 | 1/2006 | Wu et al. | |
| 2010/0029856 A1 * | 2/2010 | Moorlag et al. | 525/326.2 |

OTHER PUBLICATIONS

Xia et al. Ind. Eng. Chem. Res. 2010, 49, 12014-12021.*

* cited by examiner

*Primary Examiner* — Mark Kaucher
(74) *Attorney, Agent, or Firm* — MH2 Technology Law Group LLP

(57) ABSTRACT

An fluorinated polyester compound is disclosed. The fluorinated polyester compound can be made by combining ingredients comprising a hydroxyl terminated polyphenyl ether; a carboxylic acid terminated perfluoropolyether; an acid catalyst; and a solvent. A coating solution comprising the fluorinated polyester compound and a method of coating a substrate therewith are also disclosed.

17 Claims, 1 Drawing Sheet

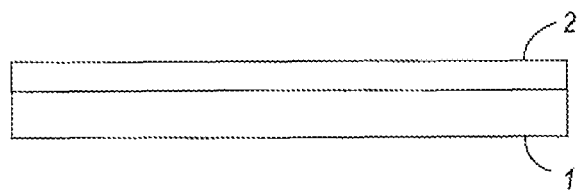

FLUORINATED POLYESTER COMPOUND, COATING COMPOSITIONS COMPRISING THE COMPOUND AND METHODS OF MAKING

DETAILED DESCRIPTION

1. Field of the Disclosure

The present disclosure is directed to a fluorinated polyester compound and a method of making the compound. In particular, the fluorinated polyester compound can be employed as an additive in solutions used for forming coatings of various types of devices.

2. Background

There has been much work in fluorinated binders and additives, which are well known for use in a variety of applications. For example, low surface energy fluoro additives are desired for wear/friction reduction, self cleaning and non sticking applications. They are commonly available in two forms: (1) insoluble particles such as PTFE and PFA; and (2) soluble fluoropolymers such as perfluoropolyether (PFPE) and VITON fluoroelastomers. These fluoropolymer additives are often blended with common polymers for final applications. For example, it is known to employ PTFE particle as dopants in polycarbonate for use as charge transport layers in photoconductors.

However, there are a number of disadvantages of the known forms of fluoro additives. For example, for insoluble particles, such as PTFE and PFA, dispersing the particles in a polymer can be challenging. Poor dispersion quality can negatively affect device performance. For soluble fluoropolymers, such as perfluoropolyether (PFPE) and VITON fluoroelastomers, the fluoropolymer itself does not easily mix with some common polymers, which can cause phase separation to occur. Consequently, it can be difficult to control the coating properties across the coating since the fluoropolymer tends to migrate to the surface instead of remaining in the bulk of the coating.

There remains a need for a novel fluorinated polyester additive, which additive is soluble in common organic solvents and/or forms compatible blends with common polymers.

SUMMARY

An embodiment of the present disclosure is directed to a fluorinated polyester compound. The fluorinated polyester compound is made by combining ingredients comprising a hydroxyl terminated polyphenyl ether; a carboxylic acid terminated perfluoropolyether; an acid catalyst; and a solvent.

Another embodiment of the present disclosure is directed to a method of forming a fluorinated polyester compound. The method comprises mixing a hydroxyl terminated polyphenyl ether, a carboxylic acid terminated perfluoropolyether, and a solvent. The mixture is heated in the presence of an acid catalyst to form the fluorinated polyester compound.

Yet another embodiment of the present disclosure is directed to a coating solution. The coating solution comprises a fluorinated polyester compound made by combining ingredients comprising a hydroxyl terminated polyphenyl ether, a carboxylic acid terminated perfluoropolyether, an acid catalyst, and a first solvent. The resulting fluorinated polyester compound is combined with a second polymer and a second solvent to form the coating solution.

It is to be understood that both the foregoing general description and the following detailed description are exemplary and explanatory only and are not restrictive of the present teachings, as claimed.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings.

FIG. 1 illustrates a coated substrate, according to an embodiment of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawing. In the following description, reference is made to the accompanying drawing that forms a part thereof, and in which is shown by way of illustration a specific exemplary embodiment in which the present teachings may be practiced. The following description is, therefore, merely exemplary.

The present disclosure is directed to a novel fluorinated polyester compound and a method of making the compound. The fluorinated polyester compound can be made by combining ingredients comprising a carboxylic acid terminated perfluoropolyether, a hydroxyl terminated polyphenyl ether, an acid catalyst and a solvent.

The carboxylic acid terminated perfluoropolyether can be any suitable carboxylic acid terminated polyether compound in which the carbons of the ether group are substituted with fluorine instead of hydrogen. Examples of suitable carboxylic acid terminated perfluoropolyethers include the compounds of formula 1:

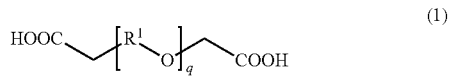

(1)

where q is an integer ranging from about 5 to about 200, such as about 10 to about 150 or 15 to about 100; and $R^1$ is chosen from $C_1$ to $C_4$ linear or branched perfluorinated alkyls, such as fluorinated ethyl or propyl groups. In an embodiment, the C—H bonds on the terminal carboxylic acid groups of formula 1 can also be C—F bonds. An example of a suitable carboxylic acid terminated perfluoropolyether of formula 1 where $R^1$ is a perfluorinated ethyl group is shown below in formula 2:

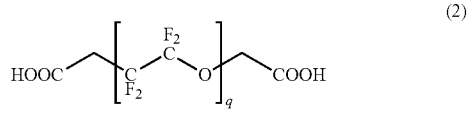

(2)

wherein q can be defined as in formula 1 above, and in an embodiment can range from about 5 to about 100. The number average molecular weight for compounds of formulae 1 and 2 can range, for example, from about 200 to about 3,500, such as about 300 to about 3,000, or about 500 to about 2,500.

Any suitable hydroxyl terminated polyphenyl ether compound can be employed to form the fluorinated polyesters of the present disclosure. Examples of suitable hydroxyl terminated polyphenyl ethers include the compounds of formula 3:

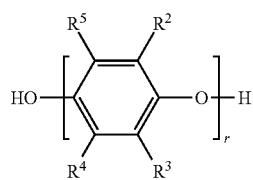

(3)

where r is an integer ranging from about 5 to about 500, such as about 10 to about 400, or about 50 to about 250 or 300; and $R^2$, $R^3$, $R^4$ and $R^5$ are independently chosen from hydrogen and $C_1$ to $C_4$ linear or branched alkyls, such as methyl or ethyl groups. In an embodiment, at least one of the $R^2$, $R^3$, $R^4$ and $R^5$ groups are not hydrogen. For example, $R^2$ and $R^3$ can be a group other than hydrogen, and groups $R^4$ and $R^5$ can be hydrogen, such as in the hydroxyl terminated polyphenyl ether of formula (4):

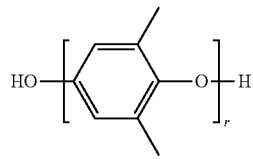

(4)

where $R^2$ and $R^3$ are methyl groups, and r can be defined as shown for formula 3 above. In an embodiment, r can range from about 5 to about 400. For the compounds of formulae 3 and 4, the number average molecular weight can range, for example, from about 200 to about 3,500, such as about 300 to about 3,000, or about 500 to about 2,500.

Any suitable solvents can be employed for making the fluorinated polyester compounds of the present disclosure. Examples of suitable organic solvents include tetrahydrofuran ("THF"), toluene, methylene chloride, or monochlorobenzene. In an embodiment, the solvent comprises THF.

Any suitable acid capable of catalyzing the reaction of the carboxylic acid terminated perfluoropolyether and the hydroxyl terminated polyphenyl ether can be employed. Examples of suitable acid catalysts include nitric acid, sulfuric acid or hydrochloric acid.

The carboxylic acid terminated perfluoropolyether and the hydroxyl terminated polyphenyl ether are reacted to form a fluorinated polyester compound. An example product of the reaction is a compound of formula (5):

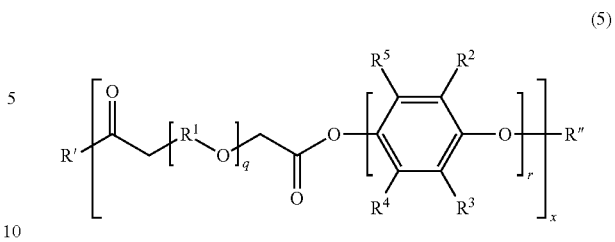

(5)

where $R^1$, $R^2$, $R^3$, $R^4$, $R^5$, q and r are defined the same as for the compounds of formulae 1 and 3 above; R' and R" groups can be independently chosen to be any suitable terminal groups, such as hydrogen, hydroxyl or alkyl groups, such as methyl or ethyl groups, or a terminal unit of the repeating groups, such as the carboxylic acid terminated perfluoropolyether or the hydroxyl terminated polyphenyl ether; and x is an integer ranging from about 5 to about 500, such as about 10 to about 400, or about 50 to about 200 or 350. The number average molecular weight can range, for example, from about 400 to about 100,000, or from about 500 to about 20,000, or from about 800 to about 10,000, or from about 1,000 to about 5,000; the weight average molecular weight can range, for example, from about 700 to about 200,000, or from about 1,000 to about 20,000, or from about 1,200 to about 10,000. The number average molecular weights and weight average molecular weights discussed here and throughout this application were determined using Gel Permeation Chromatography ("GPC") techniques.

A specific example of the carboxylic acid terminated perfluoropolyether is shown in formula 6, with q, r and x defined as above for formula 5:

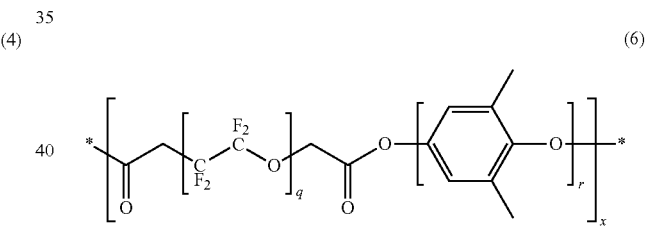

(6)

In an embodiment, q in formula 6 ranges from about 5 to about 100; r ranges from about 5 to about 300; and x ranges from about 5 to about 400. As one of ordinary skill in the art would readily understand, the compound of formula 6 can have any suitable terminal groups, such as those listed above for R' and R"

The present disclosure is also directed to a method of forming a fluorinated polyester compound. The method comprises mixing a hydroxyl terminated polyphenyl ether, a carboxylic acid terminated perfluoropolyether, and a solvent. Any suitable amount of the reactants that will result in the desired fluorinated polyester can be employed. For example, the weight ratio of hydroxyl terminated polyphenyl ether and carboxylic acid terminated perfluoropolyether can range from about 40:60 to about 60:40, such as about 45:55 to about 55:45, such as about a 50:50 by weight ratio.

Any of the polyphenyl ethers, perfluorpolyethers and solvents discussed herein can be employed for making the fluorinated polyester. The ingredients can be mixed together in any desired order or all at once. The mixture can be heated to a sufficient temperature in the presence of an acid catalyst, such as any of the acid catalysts discussed above, to form the fluorinated polyester compounds of the present disclosure.

The reaction temperature can be, for example, from about 60 to about 250 degrees Centigrade, or from about 80 to about 200 degrees Centigrade, or from about 120 to about 180 degrees Centigrade.

The fluorinated polyester compounds can be precipitated to form a solid form of the fluorinated polyester compound. The precipitate can then be collected and dried by, for example, heating under a vacuum, or by other suitable methods.

The present disclosure is also directed to a coating solution. The coating solution comprises a fluorinated polyester compound of the present disclosure, a second polymer and a solvent. The second polymer can include one or more compounds chosen from polyetherimides, polyamideimides, polyimides, polysulfones, polyphenyl sulfones, polyethersulfones, polycarbonates, polyamides, and polyesters that are different than the fluorinated polyester.

In an embodiment, the second polymer is a polyetherimide. An example of a suitable polyetherimide is the compound of formula (7):

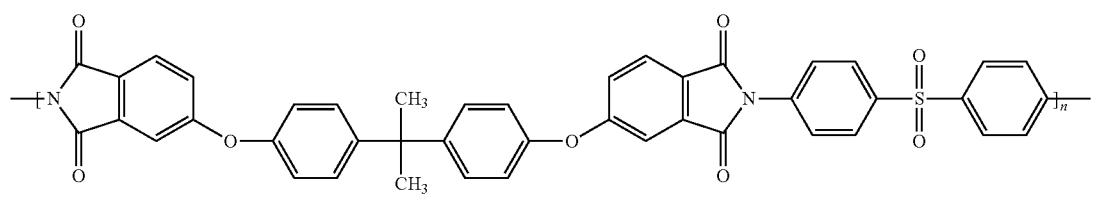

(7)

wherein n is an integer ranging from about 10 to about 250, such as 20 to about 200, or about 50 to about 150.

One or more solvents can be employed in the coating solutions of the present disclosure. An example of a suitable solvent for the coating solution is N-Methyl-2-pyrrolidone ("NMP"). Any other suitable solvent can also be employed in place of or in addition to NMP. Other examples of suitable solvents include dimethylacetamide and dimethylsulfoxide.

The fluorinated polyester compound, second polymer and solvent can be mixed together using any desired method to form the coating solution. Any suitable additional ingredients can also be included in the composition.

Another embodiment of the present disclosure is directed to a method of coating a substrate. The method can comprise providing a substrate 1, as shown in FIG. 1. The type of substrate can depend on the device being manufactured. In an embodiment, the substrate can be chosen from a stainless steel substrate, an imaging member (e.g., photoreceptor), a transfer or transfix component, such as a transfer belt or transfix roll, or a fuser.

Any of the coating solutions of the present disclosure comprising a fluorinated polyester compound, a second polymer and a solvent can be deposited over the substrate 1 to form a coating 2. After depositing the coating solution, the coating 2 can be cured by any suitable method, such as by heating for a sufficient time under vacuum.

The disclosed fluorinated polyester additive can be employed in many applications in fields such as xerography, printing or any other application where a coating with improved hydrophobicity and/or oleophobicity as compared to polytetrafluoroethylene (PTFE) may be useful. Exemplary applications include photoconductor coatings, intermediate transfer belt coatings, toners, inks and ink jet subsystems such as print heads and transfix rolls.

EXAMPLES

Example 1

Fluorinated Polyester

The polymer synthesis was conducted by reacting a hydroxyl terminated polyphenyl ether (HO-PPE-OH) and a carboxylic acid terminated perfluoropolyether (HOOC-PFPE-COOH) under heat and the catalysis of an acid in THF.

Experimentally, the carboxylic acid terminated PFPE (Fluorolink® C10, Solvay) was mixed with the hydroxyl terminated polyphenyl ether (NORYL SA90-100-0-NOR) in a weight ratio of 50/50 in THF. A small amount of nitric acid was added as the catalyst. The solution was heated and refluxed for 6 hours, and a clear dark red solution was obtained.

The solution was dropwise added into a large amount of methanol with agitation and the fluorinated polyester was precipitated and collected. The synthetic polymer was then dried at 80 degrees Centigrade under vacuum.

Example 2

Coating with Fluorinated Polyester Additive

The fluorinated polyester synthesized in Example 1 was blended with a polyetherimide to form a coating solution, as follows. The coating solution was prepared by mixing the fluorinated polyester with a polyetherimide (EXTEM® XH-1005, SABIC, structure as shown in Formula (7)) in a weight ratio of 20/80 in NMP, then coated on a stainless steel substrate via a draw bar coater, and subsequently cured at 180° C. for 60 minutes.

The 80 micron thick film was smooth and uniform with no macrophase separation due to the strong interaction between the polyphenyl ether moieties in the fluorinated polyester chain and the polyetherimide backbone. The resulting film self released from the substrate; in contrast, the polyetherimide film itself never released from the stainless steel substrate.

The resulting coating film was tested to possess high modulus and low surface energy. In particular, the fluorinated polyester/PEI film was tested for contact angles and Young's modulus. The results are shown in Table 1. The data of a conventional PTFE coating was also included for comparison.

TABLE 1

|  | PFPE/PEI resin (20/80 by weight ratio composite) | PTFE |
| --- | --- | --- |
| Water contact angle | 114° ± 2° | 110° |
| Hexadecane contact angle | 69° ± 3° | 45° |
| Young's modulus (MPa) | 3,600 | N.A. |

The resulting film was both hydrophobic and oleophobic with excellent mechanical property. The blended film did not show macrophase separation. Solution polymerization synthesis was straightforward. It is believed that the polyphenyl ether moieties improved the miscibility in the polymer blend during processing.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A fluorinated polyester compound made by combining ingredients comprising:
   a hydroxyl terminated polyphenyl ether;
   a carboxylic acid terminated perfluoropolyether compound of formula (1):

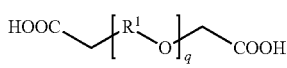

wherein $R^1$ is a linear or branched perflourinated $C_1$ to $C_4$ alkyl; and q is an integer ranging from about 5 to about 200;
   an acid catalyst; and
   a solvent.

2. The compound of claim 1, wherein the carboxylic acid terminated perfluoropolyether is a compound of formula (2):

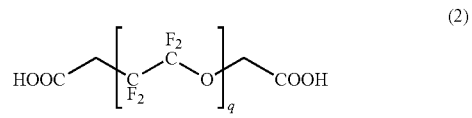

wherein q is an integer ranging from about 5 to about 200.

3. The compound of claim 1, wherein the hydroxyl terminated polyphenyl ether is a compound of formula (3):

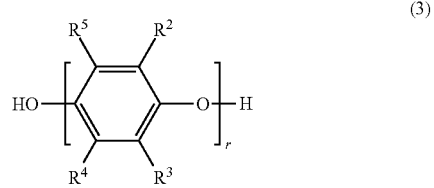

wherein $R^2$, $R^3$, $R^4$ and $R^5$ are independently chosen from hydrogen and $C_1$ to $C_4$ linear or branched alkyls; and r is an integer ranging from about 5 to about 500.

4. The compound of claim 1, wherein the hydroxyl terminated polyphenyl ether is a compound of formula (4):

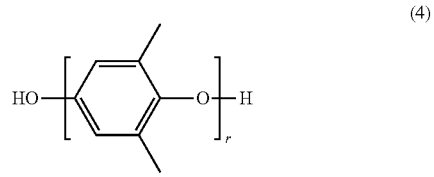

wherein r is an integer ranging from about 5 to about 500.

5. The compound of claim 1, wherein the acid catalyst comprises at least one acid chosen from nitric acid, sulfuric acid or hydrochloric acid.

6. The compound of claim 1, wherein the fluorinated polyester compound is a compound of formula (5):

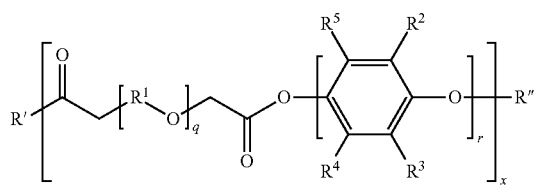

wherein $R^1$ is a linear or branched perflourinated $C_1$ to $C_4$ alkyl; $R^2$, $R^3$, $R^4$ and $R^5$ are independently chosen from hydrogen and $C_1$ to $C_4$ linear or branched alkyls; R' and R" groups are independently chosen from hydrogen, hydroxyl, alkyl groups, a carboxylic acid terminated perfluoropolyether or a hydroxyl terminated polyphenyl ether; q is an integer ranging from about 5 to about 200; r is an integer ranging from about 5 to about 500; and x is an integer ranging from about 5 to about 500.

7. The compound of claim 6, wherein the fluorinated polyester compound has a number average molecular weight ranging from about 400 to about 100,000.

8. The compound of claim 6, wherein the fluorinated polyester compound has a weight average molecular weight ranging from about 700 to about 200,000.

9. The compound of claim 6, wherein the fluorinated polyester compound is a compound of formula (6):

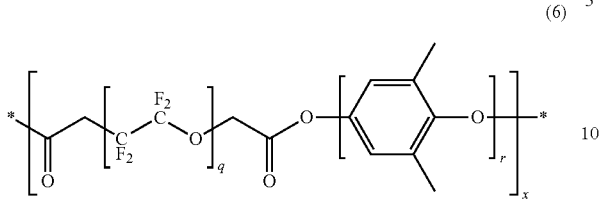

(6)

wherein q is an integer ranging from about 5 to about 200; r is an integer ranging from about 5 to about 500; and x is an integer ranging from about 5 to about 500.

10. A method of forming a fluorinated polyester compound, the method comprising:
mixing a hydroxyl terminated polyphenyl ether, a carboxylic acid terminated perfluoropolyether, and a solvent; and
heating the mixture in the presence of an acid catalyst to form the fluorinated polyester compound,
wherein the carboxylic acid terminated perfluoropolyether is a compound of formula (1):

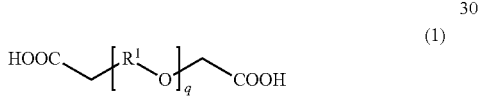

(1)

wherein $R^1$ is a linear or branched perflourinated $C_1$ to $C_4$ alkyl; and q is an integer ranging from about 5 to about 200.

11. The method of claim 10, further comprising:
precipitating the fluorinated polyester compound, and
drying the precipitate.

12. The method of claim 10, wherein the hydroxyl terminated polyphenyl ether is a compound of formula (3):

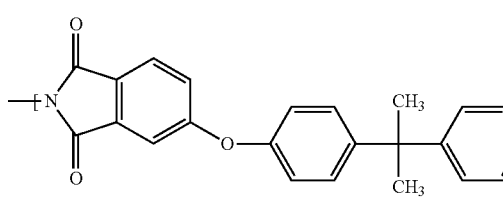

(3)

wherein $R^2$, $R^3$, $R^4$ and $R^5$ are independently chosen from hydrogen and $C_1$ to $C_4$ linear or branched alkyls; and r is an integer ranging from about 5 to about 500.

13. The method of claim 10, wherein the acid catalyst comprises at least one acid chosen from nitric acid, sulfuric acid or hydrochloric acid.

14. A coating solution comprising:
a fluorinated polyester compound made by combining ingredients comprising a hydroxyl terminated polyphenyl ether, a carboxylic acid terminated perfluoropolyether, an acid catalyst and a first solvent;
a second polymer; and
a second solvent,
wherein the fluorinated polyester compound is a compound of formula (5):

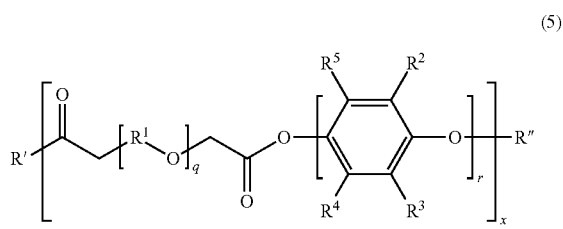

(5)

wherein $R^1$ is a linear or branched perflourinated $C_1$ to $C_4$ alkyl; $R^2$, $R^3$, $R^4$ and $R^5$ are independently chosen from hydrogen and $C_1$ to $C_4$ linear or branched alkyls; R' and R'' groups are independently chosen from hydrogen, hydroxyl, alkyl groups, a carboxylic acid terminated perfluoropolyether or a hydroxyl terminated polyphenyl ether; q is an integer ranging from about 5 to about 200; r is an integer ranging from about 5 to about 500; and x is an integer ranging from about 5 to about 500.

15. The coating solution of claim 14, wherein the second polymer can include one or more compounds chosen from polyetherimides, polyamideimides, polyimides, polysulfones, polyphenyl sulfones, polyethersulfones, polycarbonates, polyamides, and polyesters that are different than the fluorinated polyester.

16. The coating solution of claim 14, wherein the second polymer is a polyetherimide of formula (7):

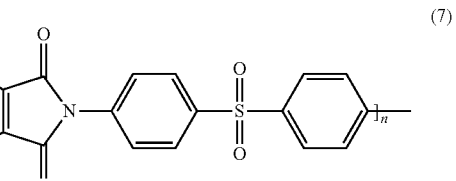

(7)

wherein n is an integer ranging from about 20 to about 200.

17. A method of coating a substrate, the method comprising:
providing a substrate;
depositing the coating solution of claim 14 on the substrate; and
curing the coating solution.

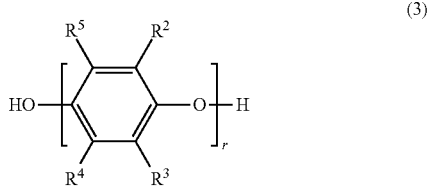

* * * * *